(12) United States Patent
Gonze et al.

(10) Patent No.: US 8,726,642 B2
(45) Date of Patent: May 20, 2014

(54) ELECTRICALLY HEATED PARTICULATE FILTER RESTRIKE METHODS AND SYSTEMS

(75) Inventors: Eugene V. Gonze, Pinckney, MI (US); Michael J. Paratore, Jr., Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 13/302,225

(22) Filed: Nov. 22, 2011

(65) Prior Publication Data

US 2013/0125534 A1 May 23, 2013

(51) Int. Cl.
*F01N 3/027* (2006.01)
(52) U.S. Cl.
USPC .......... 60/295; 60/274; 60/285; 60/286; 60/297; 60/303; 60/311; 60/320
(58) Field of Classification Search
USPC .......... 60/274, 285, 286, 295, 297, 303, 311, 60/320
See application file for complete search history.

(56) References Cited

U.S. PATENT DOCUMENTS

| | | | | |
|---|---|---|---|---|
| 4,505,107 A | * | 3/1985 | Yamaguchi et al. | 60/303 |
| 4,516,993 A | * | 5/1985 | Takeuchi et al. | 55/283 |
| 4,730,454 A | * | 3/1988 | Pischinger et al. | 60/274 |
| 5,144,798 A | * | 9/1992 | Kojima et al. | 60/303 |
| 7,458,206 B2 | * | 12/2008 | Yahata et al. | 60/297 |
| 2008/0307774 A1 | * | 12/2008 | Gonze et al. | 60/286 |
| 2009/0071124 A1 | * | 3/2009 | Gonze et al. | 60/285 |
| 2009/0071126 A1 | * | 3/2009 | Gonze et al. | 60/286 |
| 2009/0071127 A1 | * | 3/2009 | Gonze et al. | 60/286 |
| 2009/0071128 A1 | * | 3/2009 | Gonze et al. | 60/286 |
| 2009/0071129 A1 | * | 3/2009 | Gonze et al. | 60/286 |
| 2009/0071338 A1 | * | 3/2009 | Gonze et al. | 95/283 |
| 2009/0074630 A1 | * | 3/2009 | Gonze et al. | 422/174 |
| 2009/0113883 A1 | * | 5/2009 | Bhatia et al. | 60/320 |
| 2009/0183501 A1 | * | 7/2009 | Gonze et al. | 60/303 |
| 2010/0095655 A1 | * | 4/2010 | Gonze et al. | 60/287 |
| 2010/0095657 A1 | * | 4/2010 | Gonze et al. | 60/295 |
| 2010/0186384 A1 | * | 7/2010 | Gonze et al. | 60/286 |
| 2010/0186385 A1 | * | 7/2010 | Gonze et al. | 60/286 |
| 2010/0205943 A1 | * | 8/2010 | Gonze et al. | 60/286 |
| 2010/0287912 A1 | * | 11/2010 | Gonze et al. | 60/287 |
| 2010/0319315 A1 | * | 12/2010 | Gonze et al. | 60/273 |
| 2010/0326403 A1 | * | 12/2010 | Gonze et al. | 123/436 |
| 2011/0030554 A1 | * | 2/2011 | Gonze et al. | 95/26 |
| 2011/0036076 A1 | * | 2/2011 | Gonze et al. | 60/286 |
| 2011/0259190 A1 | * | 10/2011 | Gonze et al. | 95/18 |

* cited by examiner

*Primary Examiner* — Thomas Denion
*Assistant Examiner* — Jorge Leon, Jr.
(74) *Attorney, Agent, or Firm* — Cantor Colburn LLP

(57) ABSTRACT

A method of regenerating a particulate filter that includes an electric heater is provided. The method includes determining a location of particulate matter that remains within at least one region of the particulate filter based on a regeneration event being extinguished; and selectively controlling current to a zone of a plurality of zones of the electric heater to initiate a restrike of the regeneration event based on the location of particulate matter.

16 Claims, 4 Drawing Sheets

ELECTRICALLY HEATED PARTICULATE FILTER RESTRIKE METHODS AND SYSTEMS

FIELD OF THE INVENTION

The subject invention relates to methods, systems, and computer program products for regenerating a particulate filter.

BACKGROUND

Exhaust gas emitted from an internal combustion engine is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter. Catalyst compositions typically disposed on catalyst supports or substrates are provided in a diesel engine exhaust system to convert certain, or all of these exhaust constituents into non-regulated exhaust gas components.

Particulate filters remove the particulate matter from the exhaust gas. The particulate matter accumulates within the particulate filter. The accumulated particulate matter causes an increase in exhaust system backpressure experienced by the engine. To address this increase, the particulate filter is periodically cleaned, or regenerated. Regeneration of a particulate filter in vehicle applications is typically automatic and is controlled by an engine or other controller based on signals generated by engine and/or exhaust system sensors. The regeneration event involves increasing the temperature of the particulate filter to levels that are often above 600° C. in order to burn the accumulated particulates.

In some cases, an increase in exhaust flow during regeneration may decrease the temperature within the particulate filter thus, causing the regeneration to be extinguished. Accordingly, it is desirable to provide methods and systems for re-striking the regeneration after the regeneration has been extinguished to complete the regeneration.

SUMMARY OF THE INVENTION

In one exemplary embodiment, a method of regenerating a particulate filter that includes an electric heater is provided. The method includes determining a location of particulate matter that remains within at least one region of the particulate filter based on a regeneration event being extinguished; and selectively controlling current to a zone of a plurality of zones of the electric heater to initiate a restrike of the regeneration event based on the location of particulate matter.

In another exemplary embodiment, a control system for a particulate filter that includes an electric heater is provided. The control system includes a first module that determines a location of particulate matter that remains within at least one region of the particulate filter based on a regeneration event of the particulate filter being extinguished. A second module selectively controls current to a zone of a plurality of zones of the electric heater to initiate a restrike of the regeneration event of the particulate filter based on the location of particulate matter.

In yet another exemplary embodiment, an exhaust gas particulate filter system for an internal combustion engine is provided. The system includes a particulate filter configured to receive exhaust gas from the internal combustion engine. A heater device has a plurality of zones disposed in proximity to an inlet of the particulate filter. A control module determines a location of particulate matter remaining within at least one region of the particulate filter after a regeneration event, and selectively controls the heater device to activate a zone of the plurality of zones to restrike regeneration of the particulate filter based on the location of particulate matter.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
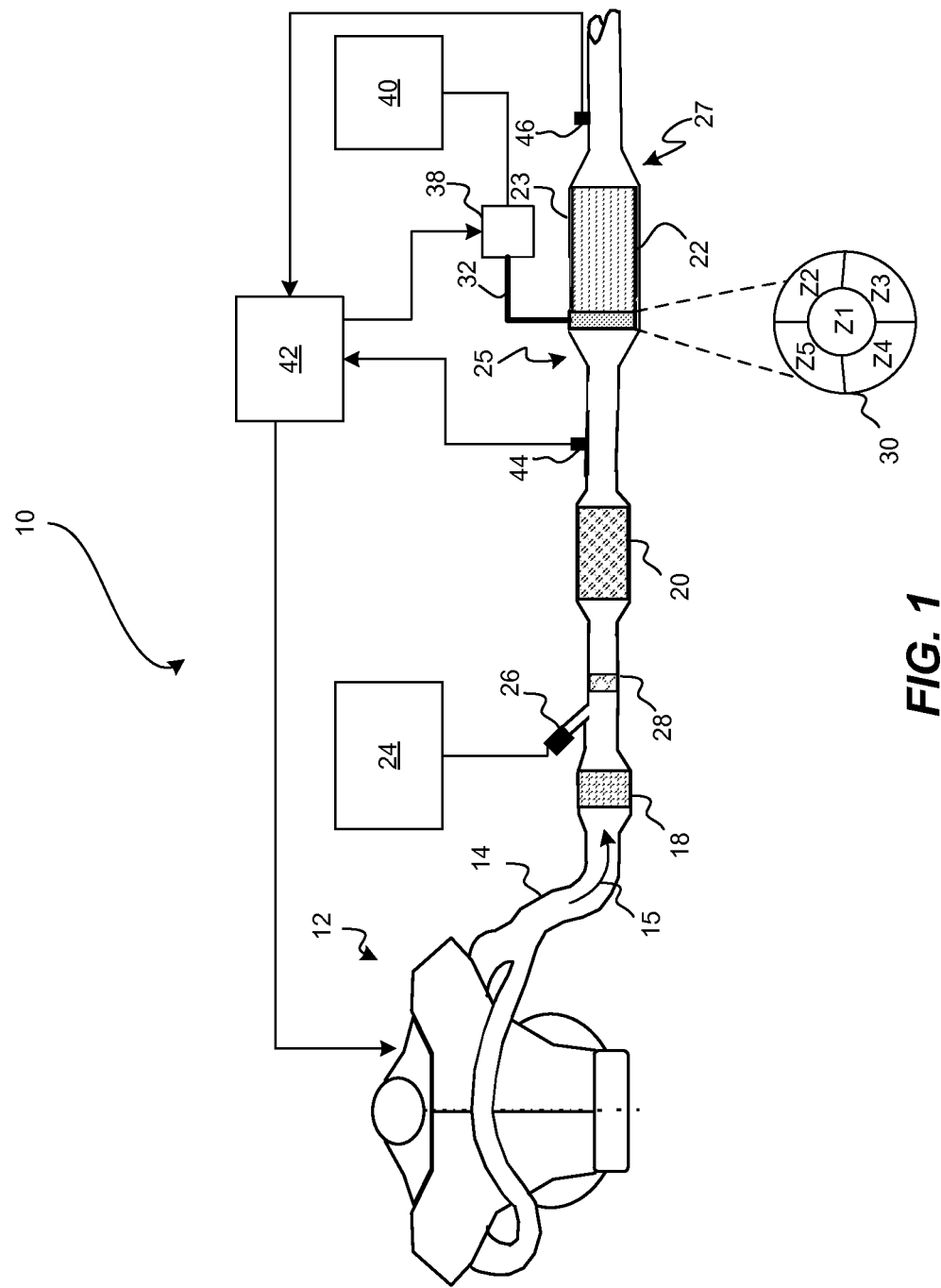
FIG. 1 is a functional block diagram of an internal combustion engine and associated exhaust treatment system that includes a regeneration restrike system in accordance with exemplary embodiments.

The following description is merely exemplary in nature and is not intended to limit the present disclosure, its application or uses. It should be understood that throughout the drawings, corresponding reference numerals indicate like or corresponding parts and features.

As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion engine 12. The exhaust gas treatment system 10 described herein can be implemented in various engine systems implementing a particulate filter. Such engine systems may include, but are not limited to, diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust treatment devices include, for example, an oxidation catalyst device (OC) 18, a selective catalytic reduction device (SCR) 20, and a particulate filter device (PF) 22. As can be appreciated, the exhaust gas treatment system of the present disclosure may include the PF 22 and various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the engine 12 to the various exhaust treatment devices of the exhaust gas treatment system 10. The OC 18 may include, for example, a flow-through metal or ceramic monolith substrate. The substrate may be packaged in a shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The SCR 20 may be disposed downstream of the OC 18. In a manner similar to the OC 18, the SCR 20 may also include, for example, a flow-through ceramic or metal monolith substrate. The substrate may be packaged in a shell or canister having an inlet and an outlet in fluid communication with exhaust gas conduit 14. The substrate can include an SCR catalyst composition applied thereto. The SCR catalyst composition can contain a zeolite and one or more base metal components such as iron (Fe), cobalt (Co), copper (Cu) or vanadium (V) which can operate efficiently to convert NOx constituents in the exhaust gas 15 in the presence of a reductant such as ammonia (NH3).

An NH3 reductant may be supplied from a reductant supply source 24 and may be injected into the exhaust gas conduit 14 at a location upstream of the SCR 20 using an injector 26, or other suitable method of delivery of the reductant to the exhaust gas 15. The reductant may be in the form of a gas, a liquid, or an aqueous urea solution and may be mixed with air in the injector 26 to aid in the dispersion of the injected spray. A mixer or turbulator 28 may also be disposed within the exhaust conduit 14 in close proximity to the injector 26 to further assist in thorough mixing of the reductant with the exhaust gas 15.

The PF 22 may be disposed downstream of the SCR 20. The PF 22 operates to filter the exhaust gas 15 of carbon and other particulates. In various embodiments, the PF 22 may be constructed using a ceramic wall flow monolith filter 23 that is wrapped in an intumescent mat or other suitable support that expands when heated, securing and insulating the filter 23. The filter 23 may be packaged in a shell or canister that is, for example, stainless steel, and that has an inlet 25 and an outlet 27 in fluid communication with exhaust gas conduit 14. The ceramic wall flow monolith filter 23 may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is appreciated that the ceramic wall flow monolith filter is merely exemplary in nature and that the PF 22 may include other filter devices such as wound or packed fiber filters, open cell foams, sintered metal fibers, etc.

The accumulation of particulate matter within the PF 22 is periodically cleaned, or regenerated. Regeneration involves the oxidation or burning of the accumulated carbon and other particulates in what is typically a high temperature (>600° C.) environment.

For regeneration purposes, an electrically heated device (EHD) 30 is disposed within the canister of the PF 22. In various embodiments, the EHD 30 is located at or near an inlet 25 of the filter 23. The EHD 30 may be constructed of any suitable material that is electrically conductive such as a wound or stacked metal monolith. An electrical conduit 32 that is connected to an electrical system, such as a vehicle electrical system, supplies electricity to the EHD 30 to thereby heat the device. The EHD 30, when heated, increases the temperature of exhaust gas 15 passing through the EHD 30 and/or increases the temperature of portions of the filter 23 at or near the EHD 30. The increase in temperature provides the high temperature environment that is needed for regeneration.

In various embodiments, as shown in the enlarged sectional view of FIG. 1, the EHD 30 is segmented into one or more zones that can be individually heated. For example, the EHD 30 can include a first zone Z1, also referred to as a center zone, and a plurality of other zones Z2, Z3, Z4, and Z5, also referred to as perimeter zones. As can be appreciated, the EHD 30 can include any number of zones. For ease of the discussion, the disclosure will be discussed in the context of the exemplary center zone Z1 and the perimeter zones Z2, Z3, Z4, and Z5.

As shown in FIG. 1, a switching device 38 that includes one or more switches is selectively controlled to allow current to flow from a vehicle power source 40 through the electrical conduit 32 to the zones Z1-Z5 of the EHD 30. A control module 42 may control the engine 12 and the switching device 38 based on sensed and/or modeled data. Such sensed information can be, for example, temperature information indicating a temperature of exhaust gas 15 and/or temperatures of various elements within the PF 22. The sensed information can be received from, for example, temperature sensors 44, and 46.

In various embodiments, the control module 42 controls the engine 12 and the flow of current through the switching device 38 to the EHD 30 based on regeneration restrike systems and methods of the present disclosure. The regeneration restrike systems and methods determine a region of the PF 22 to be regenerated based on an estimation of the location of remaining particulate matter within the PF 22 after a regeneration event, and initiate a restrike of the region by controlling the exhaust temperature and/or controlling current to the zone Z1-Z5 of the EHD 30 that is associated with the region.

Figure 2A:
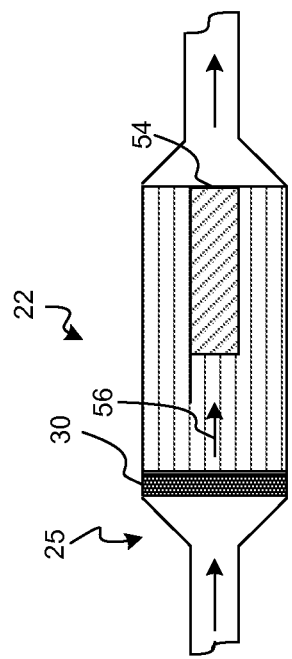
FIGS. 2A and 2B are side cross-sectional views of a particulate filter in accordance with exemplary embodiments.

For example, as shown in FIG. 2A, there may be particulate matter remaining within the PF 22 after regeneration (e.g., when regeneration has been extinguished before completion). The control module 42 can determine that an upper radial region of the PF (e.g., region 50) corresponding to zone Z2 of the EHD 30 has remaining PM therein and that this region has the highest heat temperature. Therefore, the control module 42 activates zone Z2 of the EHD 30 to transfer heat to the upper radial region to perform a restrike regeneration operation (as indicated by arrow 52).

Figure 2B:
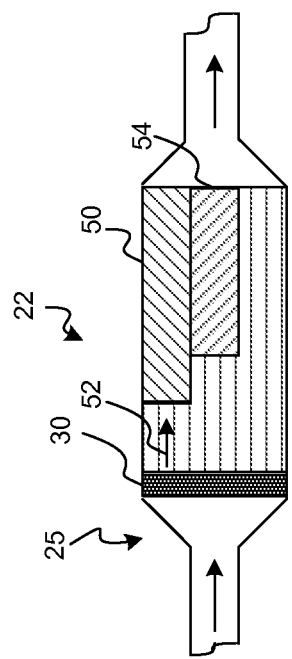

As shown in FIG. 2B, the control module 42 then determines that a center region of the PF 22 corresponding to zone Z1 of the EHD 30 has remaining PM 54 therein. Thus, the control module 42 activates zone Z1 of the EHD 30 to transfer heat to the center region and to perform a restrike regeneration operation (as indicated by arrow 56).

Figure 3:
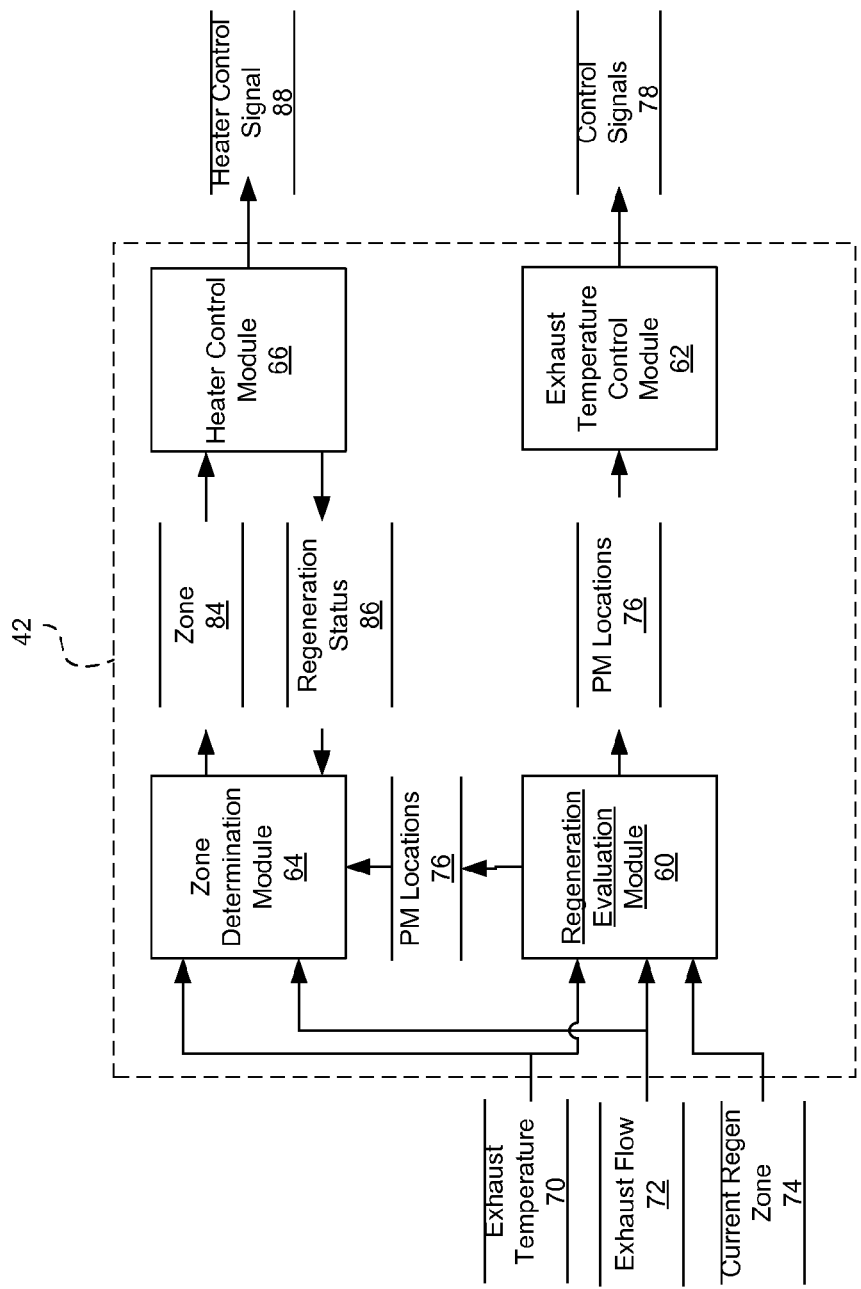
FIG. 3 is a dataflow diagram illustrating a regeneration restrike system in accordance with exemplary embodiments.

Referring now to FIG. 3, a dataflow diagram illustrates various embodiments of a particulate filter restrike regeneration system that may be embedded within the control module 42. Various embodiments of particulate filter restrike regeneration systems according to the present disclosure may include any number of sub-modules embedded within the control module 42. As can be appreciated, the sub-modules shown in FIG. 3 may be combined and/or further partitioned to similarly control regeneration of the PF 22 (FIG. 1). Inputs to the system may be sensed from the engine 12 (FIG. 1), received from other control modules (not shown), and/or determined/modeled by other sub-modules (not shown) within the control module 42. In various embodiments, the control module 42 includes a regeneration evaluation module 60, an exhaust temperature control module 62, a zone determination module 64, and a heater control module 66.

The regeneration evaluation module 60 receives as input exhaust temperature 70, exhaust flow 72, and a current regeneration zone 74. In various embodiments, the exhaust temperature 70 is a temperature of exhaust gas exiting the PF 22. Based on the inputs 70, 72, 74, the regeneration evaluation module 60 evaluates whether the regeneration has completed in the region of the PF 22 associated with the current regeneration zone 74 and, if it has not completed, at what location in the PF 22 the regeneration has been extinguished. For example, the exhaust temperature 70 can be evaluated based on the time elapsed during the regeneration of the current regeneration zone to see if and when the regeneration has been extinguished and sets a PM location 76 based thereon. The regeneration module 60 determines a PM location 76 for each zone and associated region that has been regenerated and that has had the regeneration extinguished prior to completion.

The exhaust temperature control module 62 receives as input the PM locations 76. If the PM locations 76 indicate that regeneration has not completed in at least one of the regions of the PF 22, the exhaust temperature control module 62 generates control signals 78 to the engine 12 and/or the injector 26 to increase a temperature of the exhaust gas 15 entering the PF 22. In various embodiments, the exhaust temperature control module 62 controls a temperature of the exhaust gas 15 to a predetermined temperature (e.g., 700 degrees Celsius, or other temperature).

The zone determination module 64 receives as input the PM locations 76, exhaust temperature 70, and exhaust flow 72. Based on the inputs, the zone determination module 64 determines which zone 84 of the plurality of zones Z1-Z5 to be activated to re-activate the regeneration. In various embodiments, the zone determination module 64 can determine the zone 84 by determining the region in the PF 22 with the most remaining particulate matter that is closest to the inlet 25 of the PF 22 based on the PM locations 76, and select the zone 84 that corresponds with that region.

In various other embodiments, the zone determination module 64 can evaluate the exhaust temperature 70 and exhaust flow 72 in addition to the PM locations 76 and determine whether the region in the PF 22 with the most remaining particulate matter that is closest to the inlet 25 of the PF 22 or some other region should be regenerated. For example, a flow pattern within the PF 22 can be determined from the PM locations 76 (e.g., exhaust flows in the least resistance path, that is the path with the least amount of particulate matter, thus the flow pattern can be predicted based on the location of the particulate matter). The flow pattern and the measured exhaust temperature 70 can then be evaluated to predict the uniformity of the temperature within the PF 22 (e.g., if the flow pattern is predominantly center, the temperature of the center is typically higher than the temperature in the exterior). The zone determination module 64 can then select the zone 84 based on the uniformity of the temperature within the PF 22.

In various embodiments, once the zone 84 is selected, the zone determination module 64 waits to receive a regeneration status 86 for that zone before evaluating the inputs 70, 72, 76 to select the next zone 84. As can be appreciated, the evaluation of the regeneration status 86 and the inputs 70, 72, 76 can repeat any number of times and/or until full regeneration of the PF 22 is complete.

The heater control module 66 receives as input the zone 84. Based on the zone 84, the heater control module 66 generates control signals 88 to the switching device 38 to activate the particular zone Z1-Z5. The heater control module 66 evaluates the temperature of the exhaust gas exiting the PF 22 and generates the regeneration status 86 to indicate whether regeneration of the region associated with the zone Z1-Z5 is complete. Once regeneration of the region is complete, the heater control module 66 generates control signals 88 to the switching device 38 to deactivate the particular zone Z1-Z5.

Figure 4:
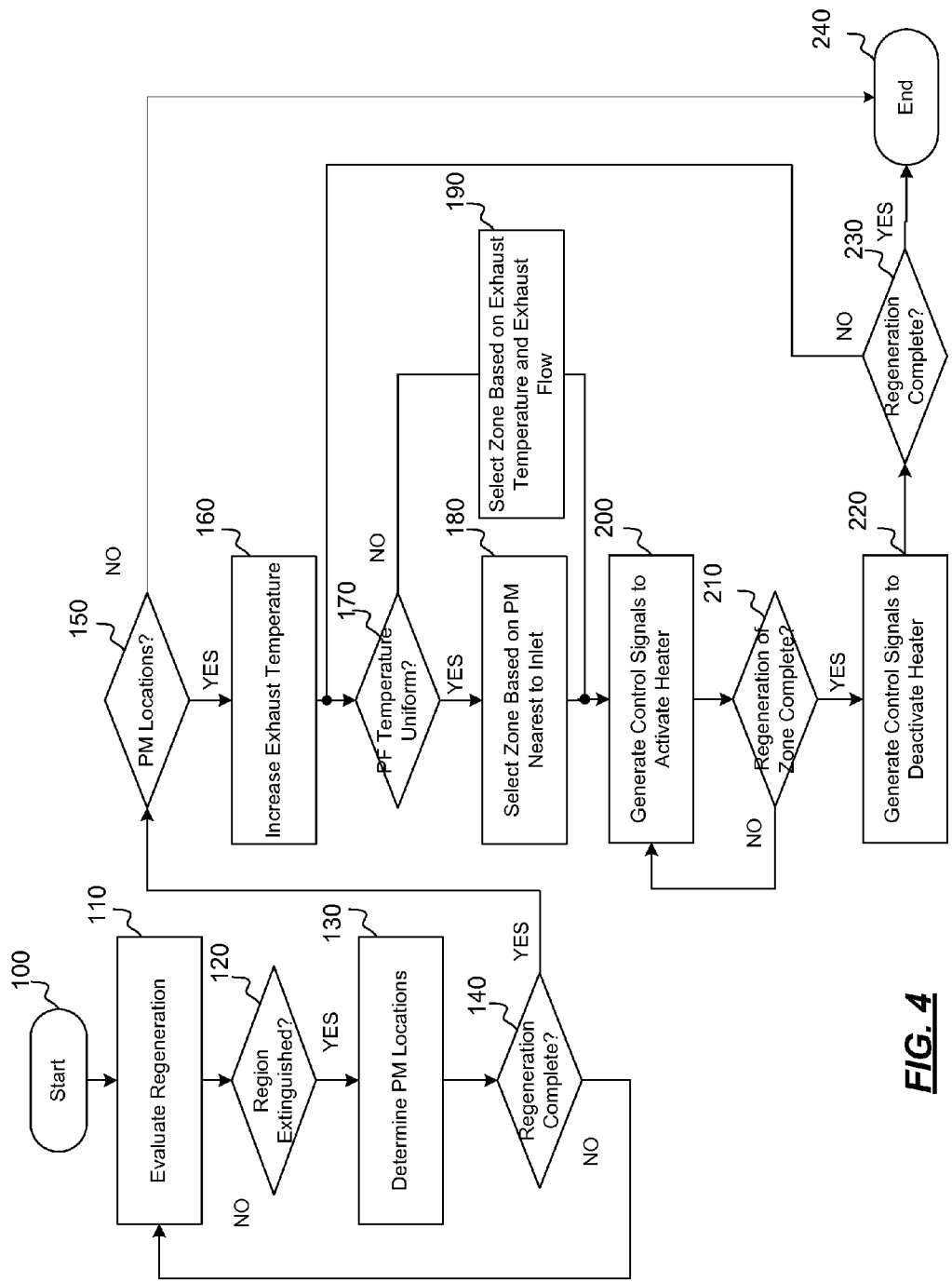
FIG. 4 is a flowchart illustrating a regeneration restrike method in accordance with exemplary embodiments.

Referring now to FIG. 4, and with continued reference to FIGS. 1 and 3, a flowchart illustrates a regeneration control method that can be performed by the control module 42 of FIG. 1 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. As can be appreciated, one or more steps of the method may be removed without altering the spirit of the method.

In various embodiments, the method can be scheduled to run based on predetermined events, and/or run continually during operation of the engine 12.

In one example, the method may begin at 100. The regeneration of a region of the PF 22 is evaluated at 110. It is determined whether the regeneration of the region has been extinguished prior to completing the regeneration at 120. If the regeneration completes in that region, the method continues with evaluating the regeneration in the next region. If, however, the region has not been fully regenerated, the PM location 76 is determined as discussed above for the region at 130. The process of regenerating and evaluating the regeneration repeats until each region has been regenerated (i.e. fully or partially) at 140.

Once each region has been regenerated (i.e., fully or partially) at 140, and if there was at least one region that was not fully regenerated at 150, the exhaust temperature is increased to a predetermined temperature, for example, by controlling the engine 12 at 160. It is then determined whether the temperature of the PF 22 is uniform throughout at 170. If it is determined that the temperature of the PF 22 is uniform at 170, the zone 84 associated with the region that has particulate matter closest to the inlet 25 of the PF 22 as indicated by the PM location 76 is selected at 180 and the control signals 88 are generated to activate the EHD 30 in the selected zone 84 at 200.

If, however, it is determined that the temperature of the PF 22 is not uniform at 170, the exhaust flow 72 and exhaust temperature 70 are evaluated to select the zone 84 with the highest temperature at 190. The control signals 88 are generated to activate the EHD 30 in the selected zone 84 at 200 until the regeneration is complete at 210.

Once the regeneration of the selected zone 84 is complete at 210. Control signals 88 are generated to deactivate the EHD 30 in the selected zone 84 at 220. It is determined whether regeneration of the PF 22 is complete at 230 (i.e., whether there are additional regions with PM locations). If regeneration of the PF 22 is not complete at 230, the method continues with evaluating the uniformity of the temperature at 170 and the regeneration of the next selected zone 84 at 180-220.

Once regeneration of the PF 22 is complete at 230, the method may end at 240.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of regenerating a particulate filter that includes an electric heater, comprising:
   determining a location of particulate matter that remains within at least one region of the particulate filter based on a regeneration event being extinguished;
   evaluating a uniformity of temperature within the particulate filter; and
   selectively controlling current to a zone of a plurality of zones of the electric heater to initiate a restrike of the regeneration event based on the location of particulate matter and the uniformity of temperature.

2. The method of claim 1, further comprising generating control signals to an engine to increase a temperature of exhaust gas exiting the engine based on the location of particulate matter.

3. The method of claim 2, wherein the selectively controlling the electric heater is based on the increase in temperature of the exhaust gas.

4. The method of claim 1, wherein the evaluating the uniformity of temperature comprises predicting a flow pattern within the particulate filter based on exhaust flow and the location, and evaluating the flow pattern and a temperature of exhaust exiting the engine.

5. The method of claim 1, further comprising controlling the regeneration event of the at least one region of the particulate filter, and wherein the determining the location is based on a temperature of exhaust exiting the particulate filter and a time elapsed during the regeneration event of the region.

6. A control system for a particulate filter that includes an electric heater, comprising:
   a computer processing device; and
   logic executable by the computer processing device, the logic configured to:
   determine a location of particulate matter that remains within at least one region of the particulate filter based on a regeneration event of the particulate filter being extinguished;
   evaluate a uniformity of temperature within the particulate filter; and
   selectively control current to a zone of a plurality of zones of the electric heater to initiate a restrike of the regeneration event of the particulate filter based on the location of particulate matter and the uniformity of temperature.

7. The control system of claim 6, wherein the logic is further configured to generate control signals to an engine to increase a temperature of exhaust gas exiting the engine based on the location of particulate matter.

8. The control system of claim 7, wherein the logic is further configured to selectively control current to the electric heater based on the increase in temperature of the exhaust gas.

9. The control system of claim 6, wherein the logic is further configured to evaluate the uniformity of temperature by predicting a flow pattern within the particulate filter based on exhaust flow and the location, and evaluating the flow pattern and a temperature of exhaust exiting the engine.

10. The control system of claim 6, wherein the logic is further configured to control the regeneration event of the at least one region of the particulate filter and determine the location based on a temperature of exhaust exiting the particulate filter and a time elapsed during the regeneration event of the region.

11. An exhaust gas particulate filter system for an internal combustion engine, comprising:
    a particulate filter configured to receive exhaust gas from the internal combustion engine;
    a heater device having a plurality of zones disposed in proximity to an inlet of the particulate filter; and
    a computer processing device implementing logic that determines a location of particulate matter remaining within at least one region of the particulate filter after a regeneration event, evaluates a uniformity of temperature within the particulate filter, and selectively controls the heater device to activate a zone of the plurality of zones to restrike regeneration of the particulate filter based on the location of particulate matter and the uniformity of temperature.

12. The system of claim 11, wherein the computer processing device is further configured to control the engine to increase a temperature of exhaust gas exiting the engine based on the location of particulate matter.

13. The system of claim 12, wherein the computer processing device selectively controls the heater device based on the increase in temperature of the exhaust gas.

14. The system of claim 11, wherein the computer processing device evaluates the uniformity of temperature by predicting a flow pattern within the particulate filter based on exhaust flow and the location.

15. The system of claim 14, wherein the computer processing device further evaluates the uniformity of temperature by evaluating exhaust temperature and the flow pattern.

16. The system of claim 11, wherein the computer processing device controls regeneration of the particulate filter, region by region, and wherein the computer processing device determines the location based on a temperature of exhaust exiting the particulate filter and a time elapsed during the regeneration of the region.

* * * * *